United States Patent
Kanungo et al.

(10) Patent No.: US 11,127,034 B1
(45) Date of Patent: Sep. 21, 2021

(54) AUTOMATED GENERATION OF DIRECTED CONTENT CAMPAIGNS

(71) Applicant: Amazon Technologies, Inc., Seattle, WA (US)

(72) Inventors: Yashal Shakti Kanungo, Bangalore (IN); Sumit Negi, Bangalore (IN); Aruna Rajan, Bangalore (IN); Meghana S. Shivanand Rajamane, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/933,873

(22) Filed: Jul. 20, 2020

(51) Int. Cl.
*G06Q 30/02* (2012.01)
*G06N 20/00* (2019.01)
*G06Q 30/06* (2012.01)

(52) U.S. Cl.
CPC ......... *G06Q 30/0244* (2013.01); *G06N 20/00* (2019.01); *G06Q 30/0246* (2013.01); *G06Q 30/0603* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 9,898,753 | B2 * | 2/2018 | Lara | G06Q 30/02 |
| 2009/0190473 | A1 * | 7/2009 | Gassewitz | H04L 43/00 |
| | | | | 370/235 |
| 2014/0032306 | A1 * | 1/2014 | Sukornyk | G06Q 30/0269 |
| | | | | 705/14.43 |
| 2014/0278921 | A1 * | 9/2014 | Sankaran | G06Q 30/0245 |
| | | | | 705/14.44 |

(Continued)

FOREIGN PATENT DOCUMENTS

KR   10-1163196 B1 *   7/2012   ............. G06Q 50/10

OTHER PUBLICATIONS

Meiss, Mark; Goncalves, Bruno; Ramasco, Jose J.; Flammini, Alessandro; Menczer, Filippo: Agents, Bookmarks and Clicks: A topical model of Web traffic (English), Proceedings of the 21th ACM conference on Hypertext and hypermedia, 229 (2010), Mar. 27, 2010 (Year: 2010).*

*Primary Examiner* — Marilyn G Macasiano
(74) *Attorney, Agent, or Firm* — Eversheds Sutherland (US) LLP

(57) ABSTRACT

Technologies are provided for automated generation of directed content campaigns. The generated campaign can be optimized for performance. In some embodiments, a group of variations of attributes that define a directed content campaign can be generated and allocated traffic weights for respective impressions of the directed content campaign in a media outlet channel. The traffic weights can then be iteratively updated until a termination criterion is satisfied. At each iteration, the traffic weight can be updated by applying a machine-learning model to current performance metric values of respective impressions corresponding to the traffic weights. After termination of the updates to the traffic weights, a particular set of variations having traffic weights exceeding a threshold can be selected as directed content campaign having satisfactory performance. Those variations can be supplied to a requestor device for subsequent utilization.

20 Claims, 6 Drawing Sheets

(56) References Cited

U.S. PATENT DOCUMENTS

| | | | |
|---|---|---|---|
| 2014/0279251 A1* | 9/2014 | Cheng | G06F 16/9535 705/26.62 |
| 2015/0149373 A1* | 5/2015 | Chhaya | G06Q 30/0282 705/319 |
| 2016/0335661 A1* | 11/2016 | Palmer | H04L 51/32 |

* cited by examiner

AUTOMATED GENERATION OF DIRECTED CONTENT CAMPAIGNS

BACKGROUND

Advertisements are complex and include attributes beyond an image and text. Indeed, a larger number of attributes (for example, headline, targeting criteria, etc.) can be configured to create an advertisement. Thus, manual inspection of a space of attributes can be an impractical approach to generating an advertisement having a satisfactory performance (for example, click through rate, views, etc.). Even when performance data is used to guide the exploration of the space of attributes, the resulting exploration can be limited because the performance data represents the performance of a group of attributes defining the advertisement as a whole, rather than quantifying the effect of a particular attribute (for example, headline or presence of video content or other media) to the performance of the attribute. Further, exploration of the space of attributes that yield numerous advertisements can be resource intensive and costly, not only in terms of time resources but also in the human capital that can be involved in successful exploration.

Accordingly, improved technologies that yield advertisement campaigns having satisfactory performance may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses the issue of generating directed content campaigns having satisfactory performance. The disclosure provides technologies for automated generation of advertisement campaigns that are optimized for viewing time, number of clicks, click-through rate, conversion rate, and/or other performance metrics. To that end, an advertisement campaign for a product is defined in terms of a group of attributes. The attributes can include a combination of visual attributes, aural attributes, and performance attributes. The technologies then generate multiple variations of the advertisement campaign by changing respective values of one or several attributes in the group of attributes. Thus, each variation of the advertisement campaign corresponds to a set of defined values of the group of attributes. Such a variation defines a campaign variant.

The disclosed technologies can then allocate, to each campaign variant, a respective proportion of the total impression traffic available to the advertisement of the product in one or several media outlet channels (for example, web, mobile, in-application, etc.). The technologies collect response data defining performance of each of the campaign variants. The performance can be characterized by one or a combination of dwell time, number of clicks, click-through rate, conversion rate, or similar performance metric.

The response data can be used to update the impression weights of respective campaign variants. Updating the impression weights can include increasing impression weights of some campaign variants and decreasing the impression weights of other campaign variants. The updated impression weights result in an updated allocation of the amounts of impression traffic corresponding to the campaign variants. The updated allocation is then utilized to generate updated response data. Further updates of impression weights can be implemented iteratively, as further response data becomes iteratively available. A result of such an iterative process are sequential performance rankings of the campaign variants. Once a termination rule is satisfied, no further updates to the impression weights are performed and a terminal performance ranking of the campaign variants is determined. The first few ranked campaign variants can be provided to an advertiser. The advertiser can accept or discard those variants.

Figure 1:
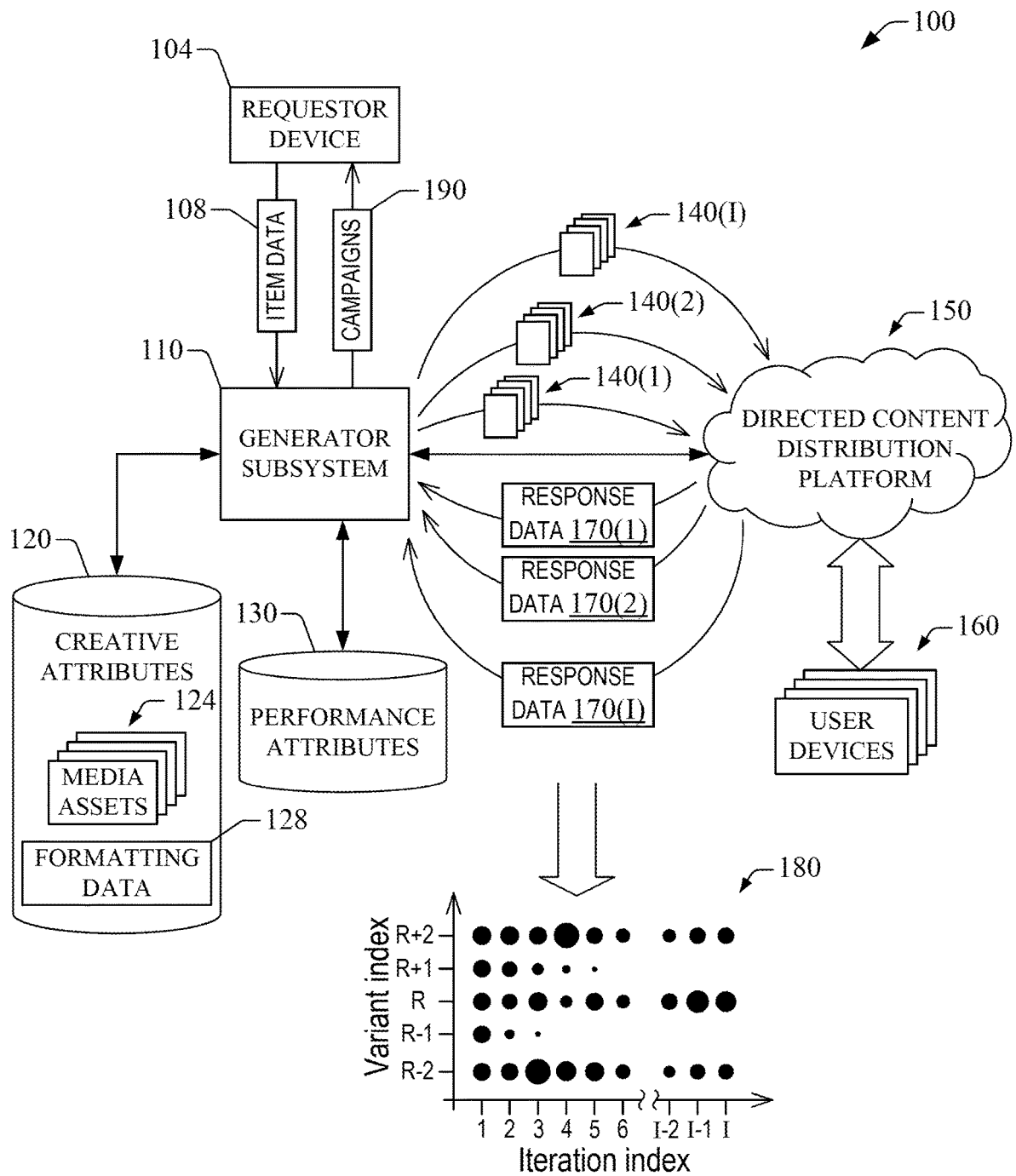
FIG. 1 illustrates an example of a operational environment for automated generation of directed content campaigns, in accordance with one or more embodiments of this disclosure.

With reference to the drawings, FIG. 1 is a schematic block diagram of an example of an operational environment 100 for automated generation of directed content campaigns, in accordance with one or more embodiments of this disclosure. In the operational environment 100, a requestor device 104 can send item data 108 identifying an item for which a directed content campaign is to generated. The item data can identify a product or a service. The service can include, for example, a content streaming service or another type of web-based service. The product can be any product within a digital marketplace, and the item data 108 can identify the product using a product identifier within the catalog. The product identifier can be embodied in, for example, an alphanumeric code or another type of datum that uniquely identifies the product within the digital marketplace. In some embodiments, rather than identifying a single item, the item data 108 can identify a brand of items.

Directed content refers, for example, to digital media configured for a particular audience and/or a particular outlet channel, such as a website, a streaming service, or a mobile application. Directed content can include, for example, digital media of various types, such as advertisement; surveys or other types of questionnaires; game challenges or riddles; motion pictures, animations, or other types of video segments; video games; podcasts; audio segments of defined durations (ringtones, songs, etc.); and the like. As such, the directed content campaign can be defined in terms of a group of attributes. A set of particular values of the group of attributes can define a variant of the directed content campaign. The attributes can include visual attributes, aural attributes, performance attributes, or a combination thereof. Visual attributes can include textual attributes or graphical attributes, or both. Thus, visual attributes can include, for example, a headline; a logotype; a layout; an animation or another type of video segment; and similar Aural attributes can include a jingle, background music, or another type of audio segment. Visual attributes and aural attributes can be collectively referred to as creative attributes. Performance attributes can include, for example, keywords to be targeted, bid amounts, and similar.

As is illustrated in FIG. 1, the requestor device 104 can send the item data 108 to a generator subsystem 110 that can be remotely located relative to the requestor device 104. While not shown in FIG. 1, one or several networks (wireless and/or wireline) or other types of communication architectures can functionally couple the requestor device 104 and the generator subsystem 110. The network(s) or the other communication architectures can be used to communicate the item data 108 from the requestor device 104 to the generator subsystem 110. The generator subsystem 110 can receive the item data 108. In response, the generation subsystem 110 can generate multiple campaign variants of a directed content campaign for the item identified by the item data 108. As mentioned, in some embodiments, the item data 108 can identify a brand of items. In those embodiments, the generator subsystem 110 can generate multiple campaign variants of the directed content campaign using several items corresponding to the brand. To that end, in some embodiments, the generation subsystem 110 can generate different configurations of values of the group of attributes that defines the directed content campaign. Each configuration of values can be represented as a set $\{a_{\lambda,1}, a_{\lambda,2}, \ldots a_{\lambda,i}, \ldots a_{\lambda,Q}\}$, where Q represents the number of attributes in the group of attributes defining the directed content campaign, and $\lambda$ is an index that represents a configuration of attribute values. Here, $\lambda=1, 2, \ldots, N$, with N being the number of the multiple campaign variants being generated. One or more first values can identify respective media assets or formatting data, or both. The generator subsystem 110 can select a media asset from an inventory of media assets 124 retained in a data store 120 (referred to as "creative attributes 120," simply for the sake of nomenclature). The generation subsystem 110 also can select the formatting data from a data structure 128 (e.g., a database) within the data store 120. In addition, one or several second values in the set can define respective performance attributes. The generator subsystem 110 can select the second value(s) from a data store 130 (referred to as "performance attributes 130," simply for the sake of nomenclature). In some embodiments, as is illustrated in FIG. 2, the generator subsystem 110 can include a configuration unit 210 that can generate the multiple variants of the directed content campaign, as is described herein.

Figure 2:
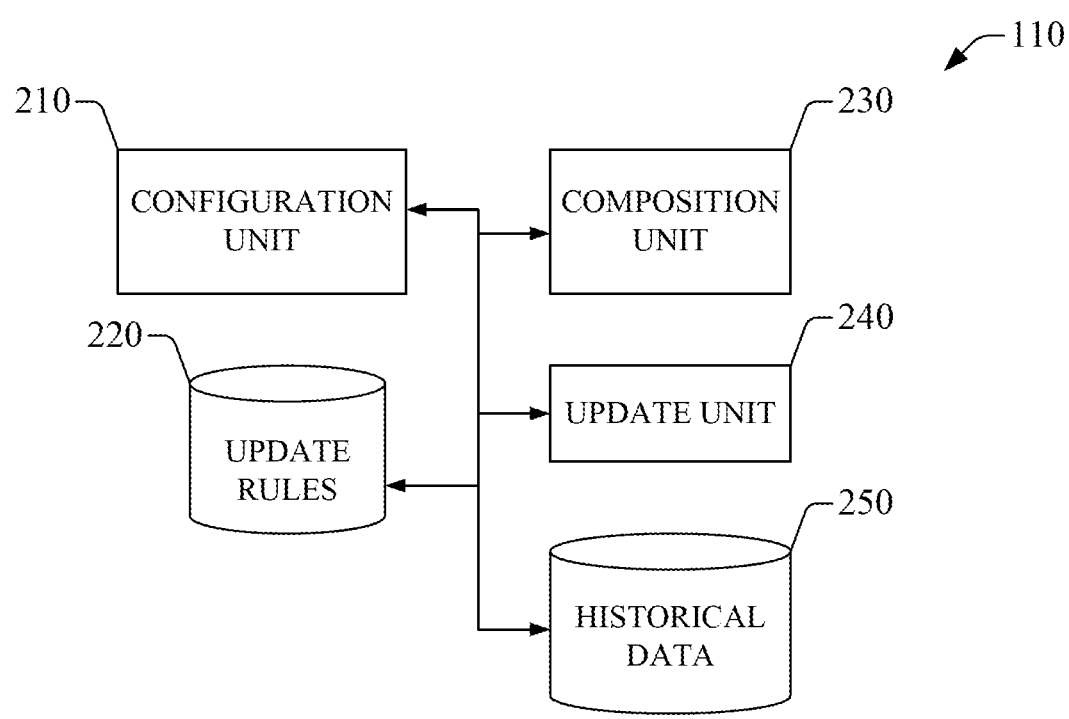
FIG. 2 illustrates an example of a system for automated generation of directed content campaigns, in accordance with one or more embodiments of this disclosure.

In some instances, as is also illustrated in FIG. 2, the generator subsystem 110 can have access to historical data 250 identifying performance of directed content campaigns for product and/or services within a digital marketplace. Such information can identify variables that are inherent to performance of directed content. Such information may be unavailable to the requestor device 104. Thus, the generator subsystem 110 can define values of one of more attributes of directed content in a manner that is not available in conventional mechanisms for configuration of a directed content campaign, much less for optimization of such a campaign. For instance, the historical information can cover ranges of attributes that are not available to a requestor platform including the requestor device 104.

After the multiple campaign variants have been created, the generator subsystem 110 can generate an allocation of traffic weights for multiple campaign variants. To that end, the generator subsystem 110 can allocate, to each campaign variant, a respective proportion of a total impression traffic volume available for directed content corresponding to the item in one or many media outlet channels (for example, web-based, mobile web, mobile application, etc.). A proportion of the total impression traffic corresponds to a traffic weight. Thus, in some instances, a traffic weight can be expressed in percentage points. An allocation of traffic weights can be represented by a tuple $w=(w_1, w_2, \ldots, w_Q)$, where $w_\lambda$ is the traffic weight of campaign variant $\lambda$ $(1, 2, \ldots, Q)$. In some instances, each campaign variation can have a same impression weight $w_0$. In other instances, each traffic weight can be randomly sampled from a particular probability distribution. In some embodiments, as is illustrated in FIG. 2, the generator subsystem 110 can include an update unit 240 that can generate the allocation of traffic weights.

The generator subsystem 110 can then iteratively modify the allocation of traffic weights w for the respective campaign variants until a termination criterion is satisfied. At each iteration, modifying the allocation of traffic weights can include increasing traffic weights of some campaign variants and decreasing the impression weights of other campaign variants. After a modification, the generator subsystem 110 can determine if the termination criterion is satisfied. In one example, the termination criterion can dictate that a magnitude of a relative change of one of the traffic weights is less than or equal to a tolerance value (expressed in percentage points, for example). Specifically, in one configuration, the generator subsystem 110 can determine that the largest traffic weight in an allocation has changed less than the tolerance value. In another configuration, the generator subsystem 110 can determine that the relative change of the traffic weight that has changed the most after a modification has not exceeded the tolerance value. In another example, the termination criterion can dictate that a function of the changes of respective traffic weights has a value that is less than or equal to a tolerance value. The function can be the average (arithmetic or geometric) of the traffic weights, for example.

The allocation of traffic weights w can be modified based at least on response data representing performance of each campaign variant. Specifically, the generator subsystem 110 can determine response data defining performance of each one of the campaign variants. The performance can be characterized by a performance metric that includes one or a combination of dwell time, clicks (number of clicks or click through rate), conversion rate, or similar In some instances, dwell time can represent viewing time of, or engagement with, an impression of a respective campaign variant. In some embodiments, the update unit 240 (FIG. 2) can subscribe to a service from an attribution server device, for example, that can provide response data identifying interactions of end-users with impressions of a directed content campaign. In some configurations, the particular performance metric that is evaluated using the response data can be determined by the generator subsystem 110. In other configurations, the generator subsystem 110 can receive data identifying the particular performance metric (e.g., dwell time, clickthrough rate, or similar) to be evaluated. Regardless of the manner of specifying the particular performance metrics, the service to which the update unit 240 subscribes to can supply response data that permits determining values of the particular performance metric. The update unit 240 (FIG. 2) can then determine performance metric values using the response data.

During the iterative modification of the allocation of traffic weights, the generator subsystem 110 can identify one or several underperforming campaign variants, and can remove such variant(s) from a current group of campaign variants. An underperforming campaign variant has a traffic weight that is less than a defined threshold value. In some embodiments, as is illustrated in FIG. 2, the generator subsystem 110 can modify the allocation of traffic weights w by means of the update unit 240. To that end, the update unit 240 can apply update rules retained in a repository 220 (referred to as update rules 220). As is discussed below, the update rules can include a machine-learning model, termination criteria, threshold values, and the like.

More specifically, simply for the purposes of illustration, as is shown in with further reference to FIG. 1, The generator subsystem 110 can generate an initial group of multiple campaign variants 140(1). As mentioned, in some cases, each campaign variant can be allocated a same traffic weight. The generator subsystem 110 can send the multiple campaign variants 140(1) to a directed content distribution platform 150. The directed content distribution platform 150 can cause impressions of the campaign variants 140(1) across user devices 160. The impressions can be distributed according to an allocation of traffic weights, as is described herein.

One or more devices of the directed content distribution platform 150 can collect response data 170(1) identifying performance of at least one of the multiple campaign variants 140(1). A device of the directed content distribution platform 150 can send the response data 170(1) to the generator subsystem 110. In response, the generator subsystem 110 can generate a next allocation of traffic weights for the multiple campaign variants 140(1). The next allocation of traffic weights can be generated by applying a machine-learning (ML) model in response data 170(1). The generator subsystem 110 can then determine if the multiple campaign variants 140(1) include an underperforming campaign variant. In the event that the generator subsystem 110 detects one or several underperforming campaign variants, the generator subsystem 110 can remove the underperforming campaign(s). In the alternative, the generator subsystem 110 can preserve the number of campaign variants 140(1).

The generator subsystem 110 can then send, to the directed content distribution platform 150, multiple campaign variants 140(2) having the next allocation of traffic weights. In some cases, rather than sending the multiple campaign variant 140(2), the generator subsystem 110 can send the next allocation of traffic weights. A null traffic weight can indicate that the respective campaign variant is underperforming and is not to be distributed across user device 160.

The directed content distribution platform 150 can cause impressions of the multiple campaign variants 140(2) according to the next allocation of traffic weights. The directed content distribution platform 150 also can collect next performance data 170(2) identifying performance of at least one of the multiple campaign variants 140(2). A device of the directed content distribution platform 150 can send the response data 170(2) to the generator subsystem 110.

The generator subsystem 110 can iteratively continue determining if received response data, including the response data 170(2), indicate presence of underperforming campaign variant(s). At each iteration, the generation subsystem 110 can remove any underperforming campaign variant(s), and can apply a machine-learning model to prior response data, including the response data 170(2), to generate a next allocations of traffic weights. In addition, or in some configurations, the generation subsystem 110 also can apply the machine-learning model to prior response data to update a current campaign variant(s). Updating current campaign variant(s) can include generate a new campaign variant and replacing an extant campaign variant in the current set with the new campaign variant. To that end, by applying the machine-learning model to the response data, a new group of attributes (visual and/or aural, for example) can be generated. The generator subsystem 110, via the composition unit 230 (FIG. 2), for example, can select a particular combination of the attributes in the new group of attributes to generate a new campaign variant. In some embodiments, the machine-learning model can be trained using historical performance metric values of directed content campaigns, by determining a solution to a reinforced-learning objective function with respect to a reward function based on the historical performance metric values. Such an iterative update process can continue until an iteration I (a natural number greater than unity) in which response data 170(I) pertaining to multiple campaign variants 140(I), or an allocation of traffic weights for those variants satisfy a termination criterion.

Simply for purposes of illustration, diagram 180 schematically depicts a series of traffic weights for a group of five campaign variants, $V_{R-2}$, $V_{R-1}$, $V_R$, $V_{R+1}$, and $V_{R+2}$, over iterations 1 to I. Each one of the traffic weights is depicted as a circle, where the area of the circle represents the magnitude of the traffic weights. As is illustrated in diagram 180, the generator subsystem 110 determines a sequence of traffic weights for $V_{R-1}$ that results in $V_{R-1}$ becoming underperforming after the third iteration and being removed from the set of evaluated campaign variants thereafter. In addition, the generator subsystem 110 determines another sequence of traffic weights for $V_{R+1}$ that results in $V_{R+1}$ becoming underperforming after the fifth iteration and being removed from the set of evaluated campaign variants thereafter. In turn, $V_{R+2}$, $V_R$, and $V_{R-2}$ are assigned respective sequences of weights, each sequence converging to respective traffic weights at iteration I.

After the iterative update process has terminated, the generator subsystem 110 can provide a list 190 of campaign variants to the requestor device 104. The generator subsystem 110 can provide the list by means of the configuration unit 210 (FIG. 2), for example. The list 190 can include all or a subset of the multiple campaign variants 140(I). In some embodiments, the generator subsystem 110 can determine a ranking of the multiple campaign variants 140(I) according to respective traffic weights of those variants. The generator subsystem 110 can then select one or many of the ranked campaign variants having respective particular placements within the ranking. For instance, the generator subsystem 110 can select the top-few ranked campaign variants. Simply as an illustration, those top-few campaigns can include the top-two, top-three, top-four, or top-five directed content campaigns.

The generator subsystem 110 (via the configuration unit 210 (FIG. 2), for example) can generate the list 190 containing the campaign variants selected using the ranking. Providing the list can include causing a requestor device 104 to present a user interface (UI) containing the list 190. In some embodiments, the UI that can be presented at the requestor device 104 can include a mechanism to accept or reject a select directed content campaign. In one configuration, the offer can be accepted or rejected by means of selection of a selectable UI element. One or several of the listed campaign variants can be accepted using selectable UI elements, for example.

Figure 3A:
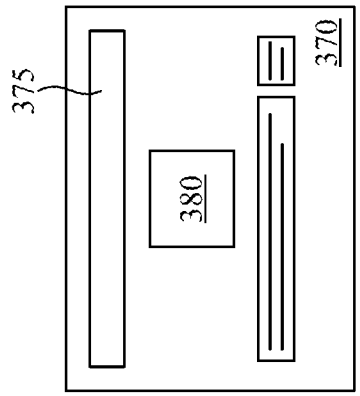
FIG. 3A illustrates an example of a variant having a defined layout of areas, in accordance with one or more embodiments of this disclosure.

In some embodiments, in addition to the item data 108, the requestor device 104 can send binding data (not depicted in FIG. 1) that defines a particular subspace of attributes that can be modified in order to generate variants of a directed content campaign. For example, the binding data can define parameters that define a layout of areas within an impression of a directed content campaign. Thus, rather than traversing different manifolds of various layout formats, the generator subsystem 110, via the composition unit 220, for example, can generate values of attributes of a variant that are confined to the layout specified by the binding data. In other words, a fixed layout of areas can be optimized by changing the respective attributes (e.g., text font, text color, background color, and similar) of one or several of the areas that compose the fixed layout and/or a background (e.g., image or color) of a particular variant. In some embodiments, the binding data also can define respective types of the areas of a layout. As an illustration, FIG. 3A illustrates an example of a bounding box 310 and a permissible layout of areas for variants of a directed content campaign. The binding data also can define types for a first area 315, a second area 320, and a third area 325. The first area 315 can be allocated to a headline. The area 320 can be defined as a video area that can present a video segment, such as an animation or another type of motion picture. The third area 325 can be allocated to a description of item and/or promotional content pertaining to the item. The generator subsystem 110 can generate variants by defining various attributes corresponding to each one of those areas.

Figure 3B:
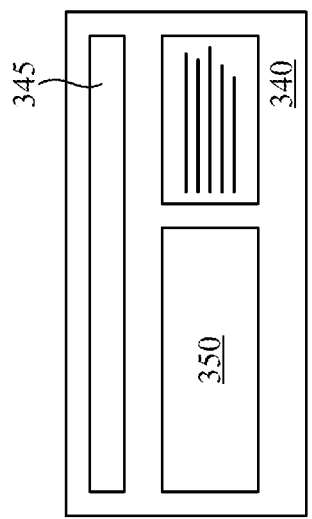
FIG. 3B illustrates another example of a variant having a defined layout of areas, in accordance with one or more embodiments of this disclosure.

As another illustration, FIG. 3B illustrates an example of a bounding box 340 and another type of permissible layout of areas for variants of a directed content campaign. The binding data also can define types for a first area 345, a second area 350, and a third area 355. The first area 345 can be allocated to a headline. The area 350 can be defined as a video area that can present a video segment, such as an animation or another type of motion picture. The third area 355 can be allocated to a description of item and/or promotional content pertaining to the item.

Figure 3C:
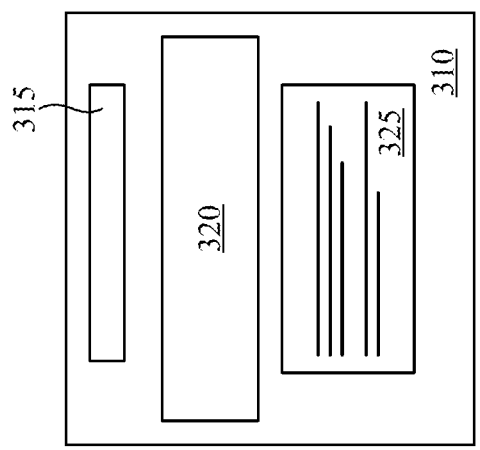
FIG. 3C illustrates yet another example of a variant having a defined layout of areas, in accordance with one or more embodiments of this disclosure.

As yet another illustration, FIG. 3C illustrates an example of a bounding box 370 and another type of permissible layout of areas for variants of a directed content campaign. The binding data also can define types for a first area 375, a second area 380, a third area 385, and a fourth area 390. The first area 375 can be allocated to a headline. The area 380 can be defined as an icon area that can present a still image, such as a logotype. The third area 385 can be allocated to a description of item and/or promotional content pertaining to the item. The fourth area can be allocated to a selectable textual are representing a call for action (e.g., "Learn more!," "Sign up!" or similar) also pertaining to the item.

Figure 4:
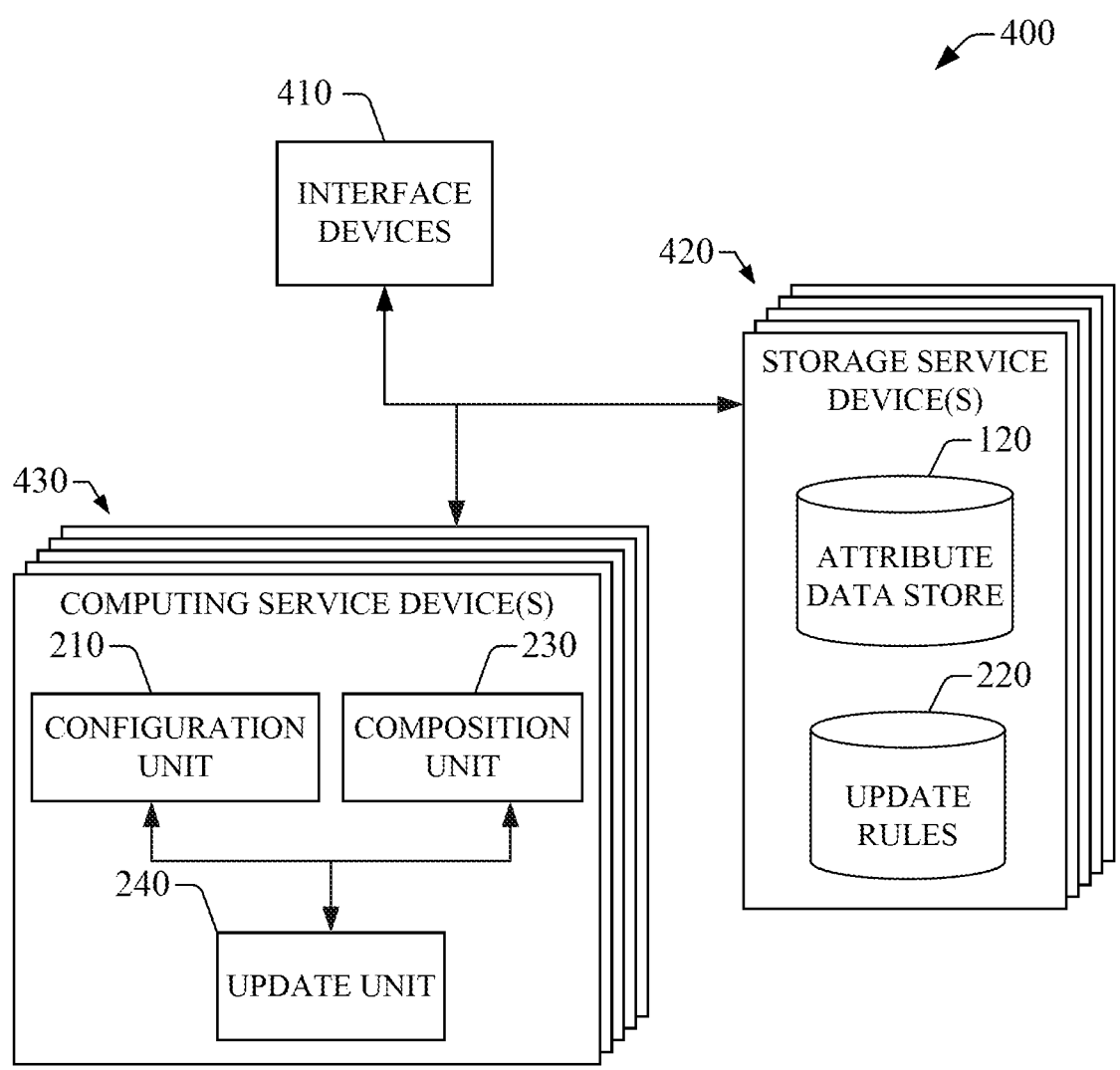
FIG. 4 illustrates an example of a computing system for automated generation of directed content campaigns, in accordance with one or more embodiments of this disclosure.

FIG. 4 is a schematic block diagram of an example of a computing system 400 for automated generation of directed content campaigns, in accordance with one or more embodiments of this disclosure. In some aspects, the computing system 400 can generate multiple variants of a directed content campaign for an item (a product or a service), wherein the directed content campaign is defined by a group of attributes, and wherein a first variant of the variants corresponds to first respective values of the group of attributes. The computing system 400 can then iteratively determine respective traffic weights for at least one of the multiple variants until a termination criterion is satisfied. A particular traffic weight of the respective traffic weights being a defined portion of a total impression traffic volume available for directed content corresponding to the item in a directed content outlet channel. In order to iteratively update the traffic weights, the computing system 400 can cause respective impressions of the at least one of the multiple variants at the directed content outlet channel. The computing system 400 can then determine performance metric values of the respective impressions, and can update the respective traffic weights by applying a machine-learning model to the performance metric values. The computing system 400 also can determine that a particular variant of the at least one multiple variants has an updated traffic weight that is less than a threshold value, and can remove the particular variant from the at least one of the multiple variants. The computing system can then determine that a group of updated respective traffic weights of the at least one of the multiple variants satisfies the termination criterion. In response, the computing system can provide a particular variant of the at least one of the multiple variants.

The example computing system 400 includes one or many interface devices 410 that can receive item data from a requestor device (e.g., device 104 (FIG. 1); not depicted in FIG. 4). As mentioned, the item data can identify a product or a service. The interface devices 610 can include one or many processors functionally coupled to one or many memory devices that can retain a data collection module or another type of content ingestion component (neither one depicted in FIG. 4). In some configurations, the data collection module can include an application programming interface (API) and/or another type of program code that can permit receiving the item data via a function call, for example. At least one of the interface devices 410 can send other types of data to the requestor device. At least a second one of the interface devices 410 can send data received from the requestor device to one or many computing service devices 430 included in the computing system 400.

As is illustrated in FIG. 4, in some embodiments, the computing service device(s) 430 can include the configuration unit 210, the composition unit 230, and the update unit 240. Each one of those units included in the computing service device(s) 430 can operate in accordance with functionality described herein in connection with the automated generation of directed content.

At least one of the computing service device(s) 430 can be functionally coupled to one or many storage devices 420. The coupling can be direct or can be mediated by at least one of the interface devices 410. For instance, the at least one device can serve as an intermediary device that served to exchange data between the computing service device(s) 430 and the one or many storage devices 420. The storage service device(s) 420 include data and metadata that can be used to implement the functionality described herein in connection with the acquisition of an item based on a directed content campaign. The storage service device(s) 420, individually or in combination, can embody, or can include, the data store 120, the data store 130, and the update rules 220. The storage service device(s) 420 can retain various types of latent information associated with historical directed content campaigns.

Figure 5:
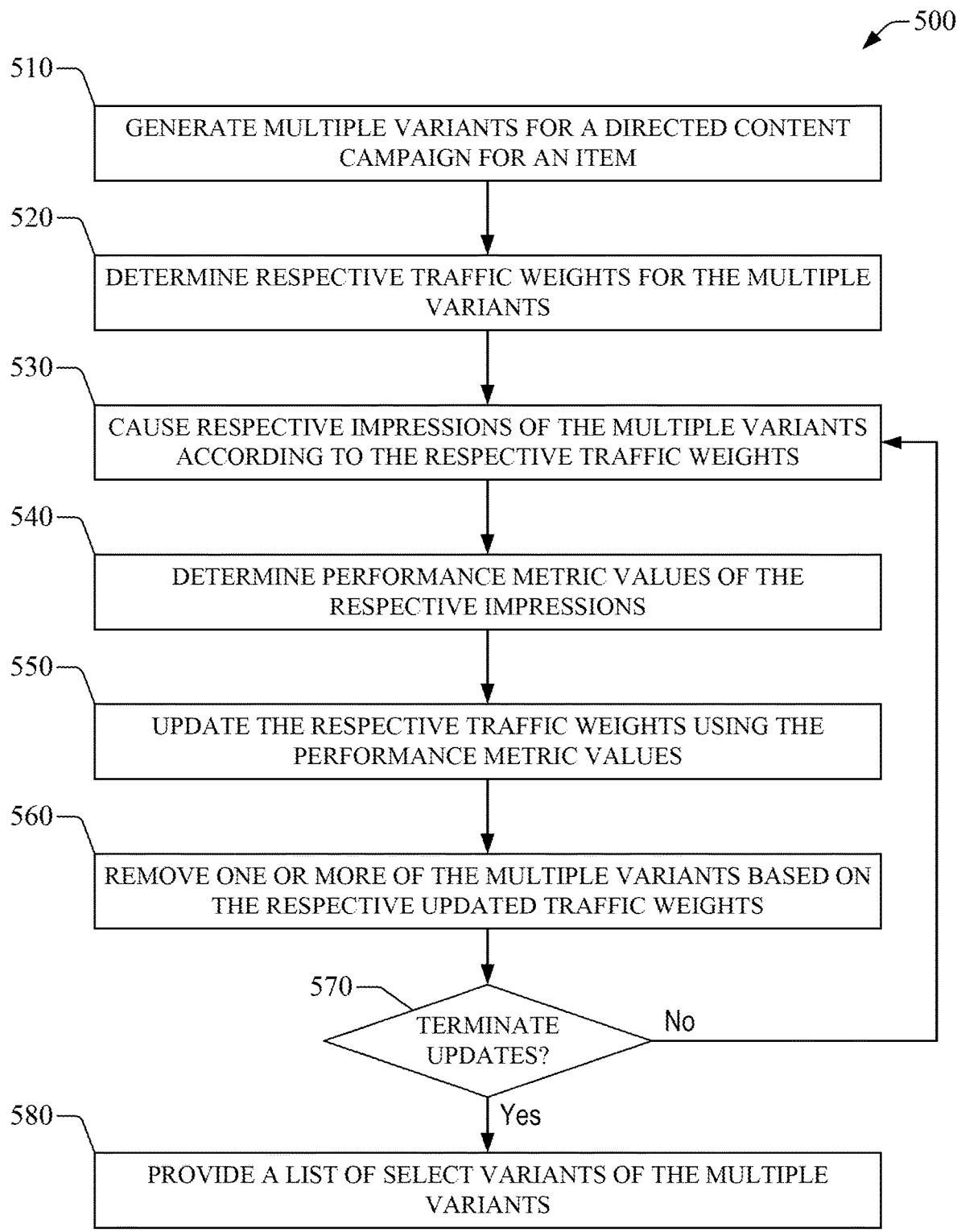
FIG. 5 illustrates an example of a method for automatically generating directed content campaigns, in accordance with one or more embodiments of this disclosure.

In view of the aspects of the techniques disclosed herein, an example method that can be implemented in accordance with this disclosure can be more readily appreciated with reference to the flowchart in FIG. 5. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

The methods of the disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 5 is a flowchart of an example of a method 500 for automatically generating directed content campaigns, in accordance with one or more embodiments of this disclosure. The example method can be implemented, entirely or partially, by a computing system having various computing resources. The computing system has at least one processor and/or is functionally coupled to at least one processor that can implement (e.g., compile, execute, compile and execute, etc.) one or more blocks of the example method 500. The computing system also can include one or many memory devices, other types of computing resources, or a combination thereof. Such processor(s), memory device(s), and computing resource(s), individually or in a particular combination, can permit the computing system to implement the example method 500, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth. The computing system can embody, or can include, the computing system 400, in some configurations.

In some scenarios, one or more blocks of the example method 500 can be implemented in a distributed fashion by two or more computing devices included in the computing system. Each one of the two or more computing devices can have at least one processor or can be functionally coupled to at least one processor, where such processor(s) can implement at least one of the one or more blocks. The computing device(s) also can be memory device(s) and/or other computing resources. Regardless of the example method 500 being implemented by a distributed or non-distributed computing system, the at least one processor can be functionally coupled to at least one memory device or other types of computer-readable non-transitory storage media.

At block 510, the computing system can generate multiple variants of a directed content campaign for an item. The item can be a product or a service. In some embodiments, rather the computing system can generate the multiple variants of a directed content campaign for a brand instead of an item. The brand can include multiple items. While not illustrated in FIG. 5, the computing system can receive data defining the item or the brand from a requestor device (e.g., requestor device 104 (FIG. 1) remotely located relative to the computing system. As mentioned, a directed content campaign can be defined in terms of campaign attributes (visual attributes, aural attributes, performance attributes, or a combination thereof). Visual attributes can include, for example, a headline, a layout, and similar Performance attributes can include, for example, keywords to be targeted, bid amounts, and similar. Accordingly, in some embodiments, generating such directed content campaigns can include generating respective combinations of values of a defined group of attributes. The defined group of attributes can define the campaign itself. As such, a first directed content campaign that is generated can have first values for the defined group of attributes; and a second directed campaign that is generated can be have second values for the defined group of attributes.

At block 520, the computing system can determine respective traffic weights for the multiple variants of the directed content campaign. In some instances, each campaign variation can have a same impression weight. In other instances, each traffic weight can be randomly sampled from a particular probability distribution. At block 530, the computing system can cause respective impressions of the multiple variants of the directed content campaign according to the respective traffic weights. In some embodiments, causing the respective impressions can include sending values of attributes for the variants and/or a current allocation of traffic weights to a device of a distribution platform, where the device can supply media assets associated with at least some of the values of the attributes to a website or another type of media outlet channel. The distribution platform can be embodied in the directed content distribution platform 150.

At block 540, the computing system can determine respective performance metric values of the respective impressions. In some embodiments, the computing system can subscribe to a service from an attribution server device, for example, that can provide response data identifying interactions of end-users with impressions of a directed content campaign. The computing system 400 (or a component therein, such as the update unit 240 (FIG. 2)) can then determine performance metric values using the response data. The performance metric can be, for example, one or a combination of dwell time, clicks (number of clicks or click through rate, for example), conversion rate, or similar In some instances, dwell time can represent viewing time of, or engagement with, an impression. In some configurations, the computing system can determine the performance metric to be evaluated. In other configurations, the computing system can receive data identifying the performance metric to be evaluated from a requestor device (e.g., the requestor device 104 (FIG. 1)) remotely located relative to the computing system.

At block 550, the computing system can update the respective traffic weights using the respective performance metric values. To that end, the computing system can apply a machine-learning model to the respective performance metric values. At block 560, the computing system can remove one or many of the variants of the directed content campaign based on the respective updated traffic weights. To that end, in some embodiments, the computing system can identify one or several variants that are underperforming, and can then remove such variant(s). A variant can be identified as an underperforming variant by comparing a traffic weight pertaining to the variant to a defined threshold value, and determining that the traffic weight is less than the defined threshold value At block 570, the computing system can determine if updates to the traffic weights have to be terminated. Updates can be terminated in response to a criterion being satisfied. In one example, such a criterion can dictate that a magnitude of a relative change of one of the traffic weights is less than or equal to a tolerance value. Specifically, in one configuration, the computing system can determine that the largest traffic weight has changed less the tolerance value. In another configuration, the computing system can determine that the relative change of the traffic weight that has changed the most after the update has not exceeded the tolerance value. In another example, the criterion can dictate that a function of the changes of respective traffic weights has a value that is less than or equal to a tolerance value. As mentioned, the function can be the average of the traffic weights, for example.

In response to a negative determination, the flow of the example method 500 can continue to block 530. In the alternative, in response to a positive determination, flow of the example method 500 can continue to block 580.

At block 580, the computing system can provide a list of select variants of the multiple variants of the directed content campaign. To that end, the computing system can determine a ranking of the remaining directed content campaigns after removal of underperforming directed content campaigns. The computing system can then select multiple ones of the remaining directed content campaigns having respective particular placements within the ranking. For instance, the computing system can select a top-few ranked directed content campaigns. As an illustration, those top-few campaigns can include the top-two, top-three, top-four, or top-five directed content campaigns. The computing system can generate a list containing the directed content campaigns selected using the ranking. Providing the list can include causing a requestor device (e.g., requestor device 104) to present a UI containing the list. More specifically, in one embodiment, the computing system can generate formatting information that defines the UI. The formatting information can define an arrangement of visual elements (selectable or otherwise) that compose the UI. At least some of the visual elements can identify elements of the list. The computing system can then send the formatting information to the requestor device that, in response, can present the UI according to the formatting information. The requestor device can be remotely located relative to the computing system.

The UI that is presented by the requestor device can include a mechanism for acceptance or rejection of a select directed content campaign. In one configuration, the offer can be accepted or rejected by means of selection of a selectable UI element. One or several of the listed directed content campaigns can be accepted using selectable UI elements, for example.

It is noted that the human mind cannot perform the example method 500 because the capacity of the human mind cannot handle the large volume of data and interrelations between the various directed content campaign and performance metric values associated with those campaigns, for example.

Figure 6:
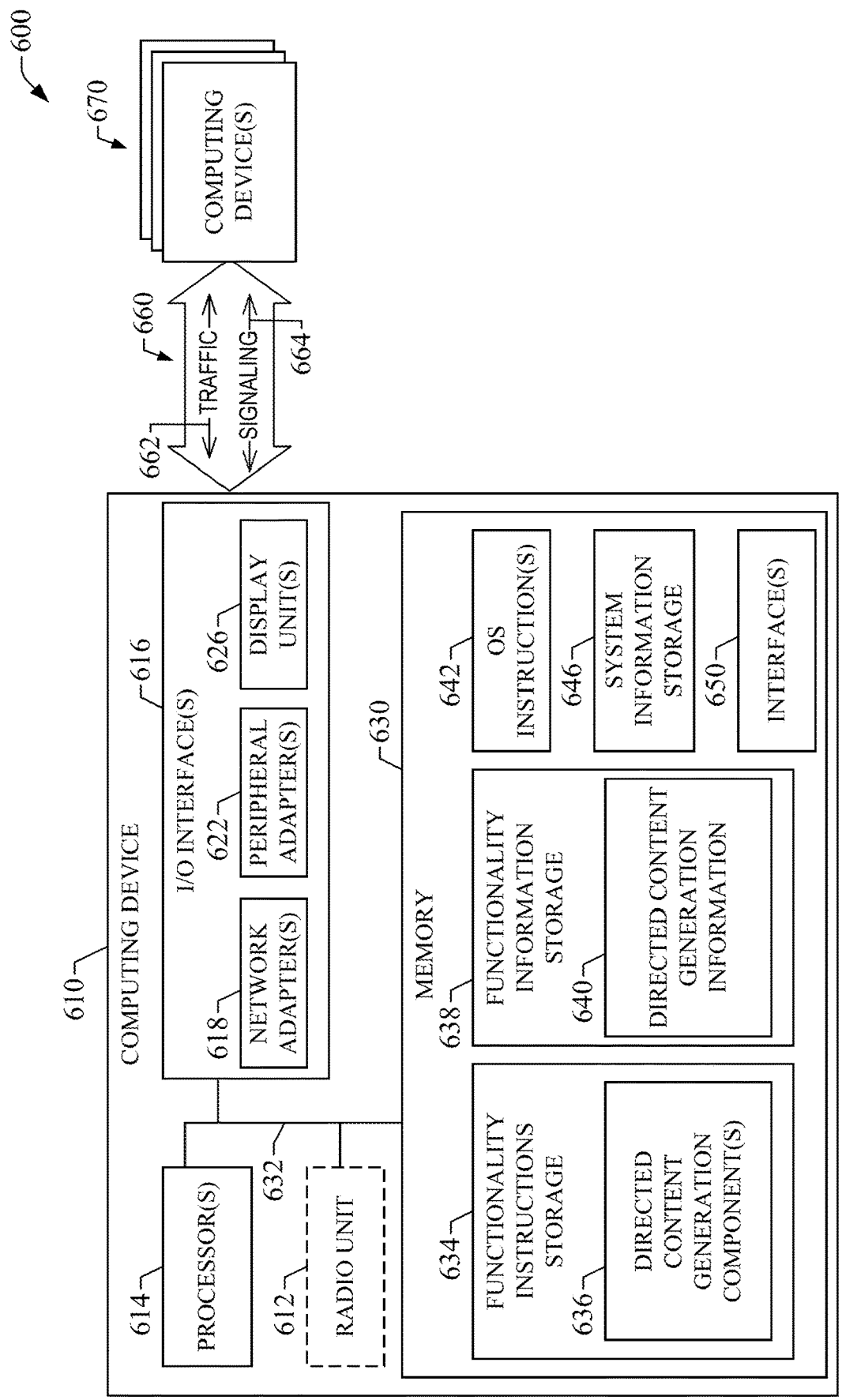
FIG. 6 illustrates an example of a computational environment for automated generation of directed content campaigns, in accordance with one or more embodiments of the disclosure.

FIG. 6 illustrates a block diagram of an example computational environment 600 for automated generation of directed content campaigns, in accordance with one or more aspects of the disclosure. The example computational environment 600 is merely illustrative and is not intended to suggest or otherwise convey any limitation as to the scope of use or functionality of the computational environment's architecture. In addition, the illustrative computational environment depicted in FIG. 6 should not be interpreted as having any dependency or requirement relating to any one or combination of components illustrated in the example operational environments of the disclosure. The example computational environment 600 or portions thereof can embody, or can include, for example, the operational environment 100 or the computing system 400, or both.

The computational environment 600 represents an example implementation of the various aspects or elements of the disclosure in which the processing or execution of operations described in connection with the generation of points of insertion of directed content into a video asset disclosed herein can be performed in response to execution of one or many software components at the computing device 610. It should be appreciated that the one or many software components can render the computing device 610, or any other computing device that contains such components, a particular machine for generation of points of insertion of directed content into a video asset as is described herein, among other functional purposes. A software component can be embodied in or can include one or many computer-accessible instructions, e.g., computer-readable and/or computer-executable instructions. In one scenario, at least a portion of the computer-accessible instructions can embody and/or can be executed to perform at least a part of one or several of the example methods disclosed herein, such as the example method presented in FIG. 5.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 610 or other computing devices. Generally, such program modules include computer code, routines, programs, objects, components, information structures (e.g., data structures and/or metadata structures), etc., that can perform particular tasks (e.g., one or more operations) in response to execution by one or more processors, which can be integrated into the computing device 610 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with the generation of points of insertion of directed content into a video asset described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 610 can include one or more processors 614, one or more input/output (I/O) interfaces 616, a memory 630, and a bus architecture 632 (also termed bus 632) that functionally couples various functional elements of the computing device 610. In certain embodiments, the computing device 610 can include, optionally, a radio unit 612. The radio unit 612 can include one or more antennas and a communication processing unit that can permit wireless communication between the computing device 610 and another device, such as one of the computing device(s) 670. The bus 632 can include at least one of a system bus, a memory bus, an address bus, or a message bus, and can permit exchange of information (data, metadata, and/or signaling) between the processor(s) 614, the I/O interface(s) 616, and/or the memory 630, or respective functional elements therein. In certain scenarios, the bus 632 in conjunction with one or more internal programming interfaces 650 (also referred to as interface(s) 650) can permit such exchange of information. In scenarios in which processor(s) 614 include multiple processors, the computing device 610 can utilize parallel computing.

The I/O interface(s) 616 can permit communication of information between the computing device and an external device, such as another computing device, e.g., a network element or an end-user device. Such communication can include direct communication or indirect communication, such as exchange of information between the computing device 610 and the external device via a network or elements thereof. As illustrated, the I/O interface(s) 616 can include one or many of network adapter(s) 618, peripheral adapter(s) 622, and rendering unit(s) 626. Such adapter(s) can permit or facilitate connectivity between the external device and one or more of the processor(s) 614 or the memory 630. For example, the peripheral adapter(s) 622 can include a group of ports, which can include at least one of parallel ports, serial ports, Ethernet ports, V.35 ports, or X.21 ports. In certain embodiments, the parallel ports can include General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 618 can functionally couple the computing device 610 to one or many computing devices 670 via one or more traffic and signaling pipes 660 that can permit or facilitate exchange of traffic 662 and signaling 664 between the computing device 610 and the one or many computing devices 670. Such network coupling provided at least in part by the at least one of the network adapter(s) 618 can be implemented in a wired environment, a wireless environment, or both. The information that is communicated by the at least one of the network adapter(s) 618 can result from the implementation of one or more operations of a method in accordance with aspects of this disclosure. Such output can be any form of visual representation, including, but not limited to, textual, graphical, animation, audio, tactile, and the like. In certain scenarios, each one of the computing device(s) 670 can have substantially the same architecture as the computing device 610. In addition, or in the alternative, the display unit(s) 626 can include functional elements that can permit control of the operation of the computing device 610, or can permit revealing the operational conditions of the computing device 610. Such functional elements can include, for example, lighting devices, such as light-emitting diodes; a display device, such as a liquid crystal display (LCD), a plasma monitor, a light emitting diode (LED) monitor, or an electrochromic monitor; combinations thereof; or similar elements.

In one aspect, the bus 632 represents one or many of several types of bus structures, including a memory bus or a memory controller, a peripheral bus, an accelerated graphics port, and a processor or local bus using any of various bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 632, and all buses described herein can be implemented over a wired or wireless network connection and each of the subsystems, including the processor(s) 614, the memory 630 and memory elements therein, and the I/O interface(s) 616 can be contained within one or more remote computing devices 670 at physically separate locations, connected through buses of this form, in effect implementing a fully distributed system. In certain embodiments, such a distributed system can implement the functionality described herein in a client-host or client-server configuration in which the directed content generation component(s) 636 or the item acquisition information 640, or both, can be distributed between the computing device 610 and at least one of the computing device(s) 670, and the computing device 610 and at least one of the computing device(s) 670 can execute such components and/or leverage such information.

The computing device 610 can include a variety of computer-readable media. Computer-readable media can be any available media (transitory and non-transitory) that can be accessed by a computing device. In one aspect, computer-readable media can include computer non-transitory storage media (or computer-readable non-transitory storage media) and communications media. As such, computer-readable non-transitory storage media can be any available media that can be accessed by the computing device 610, and can include, for example, both volatile and non-volatile media, and removable and/or non-removable media. In one aspect, the memory 630 can include computer-readable media in the form of volatile memory, such as random access memory (RAM), and/or non-volatile memory, such as read-only memory (ROM).

As is illustrated in FIG. 6, the memory 630 can include functionality instructions storage 634 and functionality information storage 638. The functionality instructions storage 634 can include computer-accessible instructions that, in response to execution (by at least one of the processor(s) 614), can implement one or more of the functionalities of the technologies disclosed herein. The computer-accessible instructions can embody, or can include, one or many software components illustrated as direct content generation component(s) 636. In one scenario, execution of at least one component of the direct content generation component(s) 636 can implement one or several of the methods described herein, such as the example method 500. For instance, such execution can cause a processor (e.g., one of the processor(s) 614) that executes the at least one component to carry out one or a combination of the disclosed techniques (including the example method 500). It is noted that, in one aspect, a processor of the processor(s) 614 that executes at least one of the directed content generation component(s) 636 can retrieve information from or retain information within one or many memory elements 640 in the functionality information storage 638 in order to operate in accordance with the functionality programmed or otherwise configured by the directed content generation component(s) 636. The one or many memory elements 640 may be referred to as directed content generation information 640. Such information can include at least one of code instructions, information structures, or the like.

In some embodiments, one or many components of the directed content generation component(s) 636 can embody, or can be part of, at least one of the configuration unit 210, the composition unit 230, or the update unit 240. As such, the one or many components can operate in accordance with, and can provide the functionality of, the configuration unit 210, the composition unit 230, and the update unit 240 in accordance with aspects described in this disclosure. In other embodiments, one or many of the directed content generation component(s) 636 in combination with at least one of the processor(s) 614 can embody or can constitute at least one of the configuration unit 210, the composition unit 230, or the update unit 240, and can operate in accordance with, and can provide the functionality of, such units in accordance with aspects described in this disclosure.

At least one of the one or more interfaces 650 (e.g., application programming interface(s)) can permit or otherwise facilitate communication of information between two or more components within the functionality instructions storage 634. The information that is communicated by the at least one interface can result from implementation of one or many operations in a method of this disclosure. In some embodiments, the functionality instructions storage 634 or the functionality information storage 638, or both, can be embodied in or can include removable/non-removable, and/ or volatile/non-volatile computer storage media.

At least a portion of at least one of the directed content generation component(s) 636 or item acquisition information 640 can program or otherwise configure one or many of the processors 614 to operate at least in accordance with the functionality described herein. One or many of the processor(s) 614 can execute at least one of the directed content generation component(s) 636 and utilize at least a portion of the information in the functionality information storage 638 in order to generate points of insertion of directed content into a video asset in accordance with one or more aspects described herein.

It should be appreciated that, in some scenarios, the functionality instruction(s) storage 634 can embody, or can include, a computer-readable non-transitory storage medium having computer-accessible instructions that, in response to execution, cause at least one processor (e.g., one or several of the processor(s) 614) to perform a group of operations including the operations or blocks described in connection with the disclosed methods.

In addition, the memory 630 can include computer-accessible instructions and information (e.g., data, metadata, and/or programming code instructions) that permit or facilitate the operation and/or administration (e.g., upgrades, software installation, any other configuration, or the like) of the computing device 610. Accordingly, as illustrated, the memory 630 can include a memory element 642 (labeled operating system (OS) instruction(s) 642) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 610 can dictate a suitable OS. The memory 630 also includes system information storage 646 having data, metadata, and/ or programming code that permits or facilitates the operation and/or administration of the computing device 610. Elements of the OS instruction(s) 642 and the system information storage 646 can be accessible or can be operated on by at least one of the processor(s) 614.

It should be recognized that while the functionality instructions storage 634 and other executable program components, such as the OS instruction(s) 642, are illustrated herein as discrete blocks, such software components can reside at various times in different memory components of the computing device 610, and can be executed by at least one of the processor(s) 614. In certain scenarios, an implementation of the directed content generation component(s) 636 can be retained on or transmitted across some form of computer-readable media.

The computing device 610 and/or one of the computing device(s) 670 can include a power supply (not shown), which can power up components or functional elements within such devices. The power supply can be a rechargeable power supply, e.g., a rechargeable battery, and can include one or more transformers to achieve a power level suitable for the operation of the computing device 610 and/or one of the computing device(s) 670, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 618) to connect operationally to the conventional power grid. In another aspect, the power supply can include an energy conversion component, such as a solar panel, to provide additional or alternative power resources or autonomy for the computing device 610 and/or one of the computing device(s) 670.

The computing device 610 can operate in a networked environment by utilizing connections to one or many remote computing devices 670. As an illustration, a remote computing device can be a personal computer, a portable computer, a server, a router, a network computer, a peer device or other common network node, or similar. As is described herein, connections (physical and/or logical) between the computing device 610 and a computing device of the one or many remote computing devices 670 can be made via one or more traffic and signaling pipes 660, which can include wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 670) that are functionally coupled (e.g., communicatively linked or otherwise coupled) through a network having traffic and signaling pipes and related network elements. In a distributed computing environment, in one aspect, one or more software components (such as program modules) can be located in both a local computing device 610 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or a thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can include solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAM). The disclosed memory components or memories of operational environments described herein are intended to include one or many of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for automated generation of directed content campaigns. It is, of course, not possible to describe every conceivable combination of elements and/or method for purposes of describing the various features of this disclosure, but it can be recognized that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
    receiving, by a computing system comprising at least one processor, item data identifying a product within a catalog in a digital marketplace, the item being received from a computing device remotely located relative to the computing system;
    generating, by the computing system, multiple variants of a directed content campaign using the item data, wherein the directed content campaign is defined by a group of attributes, and wherein a first variant of the variants corresponds to first respective values of the group of attributes;
    determining, by the computing system, respective traffic weights for the multiple variants, a first traffic weight of the respective traffic weights being a defined portion of a total impression traffic volume available for directed content corresponding to the product in a website;
    causing, by computing system, respective impressions of the multiple variants at the website;
    determining, by the computing system, values of a performance metric for the respective impressions;
    updating, by the computing system, the respective traffic weights by applying a machine-learning model to the values of the performance metric, the machine-learning model resulting from determining a solution to a reinforced-learning objective function with respect to a reward function based on performance of the directed content campaign;
    determining, by the computing system, that a particular variant of the multiple variants has an updated traffic weight that is less than a threshold value;
    removing, by the computing system, the particular variant from the multiple variants to generate second multiple variants;
    causing, by computing system, respective second impressions of the multiple variants at the website;
    determining, by the computing system, second values of the performance metric for the respective second impressions;
    updating, by the computing system, the respective traffic weights by applying the machine-learning model to the second values of the performance metric;
    determining, by the computing system, that the updated respective traffic weights of the second multiple variants satisfy a criterion for terminating updates to traffic weights; and
    sending, by the computing system, at least one of the second multiple variants to the computing device.

2. The method of claim 1, the providing comprising,
    generating, by the computing system, a ranking of the second multiple variants based on the updated respective traffic weights;
    selecting, by the computing system, the at least one of the second multiple variants by removing a group of third variants from the ranking, each variant in the group of third variants having a ranking placement below a defined ranking placement; and
    sending, by the computing system, the at least one of the second multiple variants to the computing device.

3. The method of claim 1, wherein the termination criterion dictates that a magnitude of a relative change of one of the updated respective traffic weights is less than or equal to a tolerance value.

4. The method of claim 1, wherein the performance metric comprises at least one of dwell time, a number of clicks, a click-through rate, or a conversion rate corresponding to an impression of a variant of the directed content campaign.

5. A method, comprising:
generating, by a computing system, multiple variants of a directed content campaign for an item, wherein the directed content campaign is defined by a group of attributes, and wherein a first variant of the variants corresponds to first respective values of the group of attributes;
iteratively determining, by the computing system, respective weights for at least one of the multiple variants a, a first weight of the respective weights being a defined portion of a total impression traffic volume available for directed content corresponding to the item, wherein the iteratively determining comprises,
causing, by the computing system, respective impressions of the at least one of the multiple variants at the directed content outlet channel;
determining, by the computing system, values of a performance metric for the respective impressions;
updating, by the computing system, the respective weights using the values of the performance metric;
determining, by the computing system, that a particular variant of the at least one multiple variants has an updated weight that is less than a threshold value;
removing, by the computing system, the particular variant from the at least one of the multiple variants;
determining, by the computing system, that a group of updated respective weights of the at least one of the multiple variants satisfies a termination criterion; and
sending, by the computing system, a first variant of the at least one of the multiple variants.

6. The method of claim 5, wherein the group of attributes comprises at least one of a visual attribute, an aural attribute, or a performance attribute, and wherein the performance attribute comprises one of a targeting keyword or a bid amount.

7. The method of claim 5, wherein updating the respective weights includes updating the respective weights by applying a machine-learning model to the values of the performance metric, and wherein the machine-learning model results from determining a solution to a reinforced-learning objective function with respect to a reward function based on performance of the directed content campaign.

8. The method of claim 5, the providing comprising,
generating, by the computing system, a ranking of the at least one of the multiple variants based on the updated respective traffic weights; and
removing, by the computing system, removing a group of variants from the ranking, each variant in the group of variants having a ranking placement below a defined ranking placement.

9. The method of claim 8, wherein the sending of the first variant further comprises causing, by the computing system, a computing device to present a user interface (UI) listing the first variant, the UI comprising a selectable UI element to accept the first variant.

10. The method of claim 5, wherein the termination criterion indicates that a magnitude of a relative change of one of the updated respective weights is less than or equal to a tolerance value.

11. The method of claim 5, wherein the termination criterion indicates that a function of changes of the updated respective weights has a value that is less than or equal to a tolerance value.

12. The method of claim 5, wherein the performance metric comprises at least one of dwell time, a number of clicks, a click-through rate, or a conversion rate corresponding to an impression of a variant of the directed content campaign, the method further comprising receiving, by the computing system, data identifying the performance metric from a requestor device remotely located relative to the computing system.

13. A computing system, comprising:
at least one processor; and
at least one memory device having computer-executable instructions stored thereon that, in response to execution by the at least one processor, cause the computing system to perform operation comprising:
generating multiple variants of a directed content campaign for an item, wherein the directed content campaign is defined by a group of attributes, and wherein a first variant of the variants corresponds to first respective values of the group of attributes;
iteratively determining respective traffic weights for at least one of the multiple variants until a termination criterion is satisfied, a first traffic weight of the respective traffic weights being a defined portion of a total impression traffic volume available for directed content corresponding to the item in a directed content outlet channel, wherein the iteratively determining comprises,
causing respective impressions of the at least one of the multiple variants at the directed content outlet channel;
determining performance metric values of the respective impressions;
updating the respective traffic weights by applying a machine-learning model to the performance metric values;
determining that a first variant of the at least one multiple variants has an updated traffic weight that is less than a threshold value;
removing the first variant from the at least one of the multiple variants;
determining that a group of updated respective traffic weights of the at least one of the multiple variants satisfies the termination criterion; and
providing at particular variant of the at least one of the multiple variants.

14. The computing system of claim 13, wherein the group of attributes comprises at least one of a visual attribute, an aural attribute, or a performance attribute, and wherein the performance attribute comprises one of a targeting keyword or a bid amount, the generating comprising at least one of selecting a media asset or configuring a value of the performance attribute.

15. The computing system of claim 13, wherein the machine-learning model results from determining a solution to a reinforced-learning objective function with respect to a reward function based on performance of the directed content campaign.

16. The computing system of claim 13, the providing comprising,
generating, by the computing system, a ranking of the at least one of the multiple variants based on the updated respective traffic weights; and
selecting, by the computing system, a second variant by removing a group of variants from the ranking, each variant in the group of variants having a ranking placement below a defined ranking placement.

17. The computing system of claim 16, the providing further comprising causing, by the computing system, a computing device to present a user interface (UI) listing the particular variant, the UI comprising a selectable UI element to accept the particular variant.

18. The computing system of claim 13, wherein the termination criterion dictates that a magnitude of a relative change of one of the updated respective traffic weights is less than or equal to a tolerance value.

19. The computing system of claim 13, wherein the termination criterion dictates that a function of changes of the updated respective traffic weights has a value that is less than or equal to a tolerance value.

20. The computing system of claim 13, wherein the performance metric comprises at least one of dwell time, a number of clicks, a click-through rate, or a conversion rate corresponding to an impression of a variant of the directed content campaign.

* * * * *